US005914078A

United States Patent [19]

Morrison

[11] Patent Number: 5,914,078

[45] Date of Patent: Jun. 22, 1999

[54] METHOD OF MAKING A FOAM-FILLED DOOR

[75] Inventor: Timothy L. Morrison, Palm Beach Shores, Fla.

[73] Assignee: Wayne-Dalton Corp., Mt. Hope, Ohio

[21] Appl. No.: 08/982,176

[22] Filed: Dec. 1, 1997

Related U.S. Application Data

[62] Division of application No. 08/580,837, Dec. 29, 1995, Pat. No. 5,720,142.

[51] Int. Cl.[6] .......................... B29C 44/06; B29C 44/12

[52] U.S. Cl. ......................... 264/46.5; 264/46.6; 425/812

[58] Field of Search ................................ 264/46.5, 46.6; 425/812

[56] References Cited

U.S. PATENT DOCUMENTS

| | | | |
|---|---|---|---|
| 3,153,817 | 10/1964 | Pease, Jr. | 20/35 |
| 3,389,519 | 6/1968 | Williams et al. | 264/46.5 |
| 3,546,841 | 12/1970 | Smith et al. | 264/46.5 |
| 3,786,609 | 1/1974 | Difazio | 52/619 |
| 3,793,122 | 2/1974 | Sullhofer | 264/46.5 |
| 3,837,134 | 9/1974 | Difazio | 52/619 |
| 3,846,525 | 11/1974 | Kinne et al. | 264/46.5 |
| 4,183,393 | 1/1980 | Bailey | 52/309.9 |
| 4,327,535 | 5/1982 | Governale | 52/309 |
| 4,348,164 | 9/1982 | Fujii et al. | 425/89 |
| 4,424,968 | 1/1984 | Smith | 52/802.1 |
| 4,518,550 | 5/1985 | Miettinen et al. | 264/46.5 |
| 4,539,241 | 9/1985 | Kainulainen et al. | 264/46.5 |
| 4,765,105 | 8/1988 | Tissington et al. | 264/46.5 |
| 4,779,325 | 10/1988 | Mullet | 29/460 |
| 4,860,512 | 8/1989 | Thorn | 264/46.5 |
| 5,016,415 | 5/1991 | Kellis | 52/522 |
| 5,077,948 | 1/1992 | Olson et al. | 52/309 |
| 5,142,835 | 9/1992 | Mrocca | 52/309 |
| 5,161,346 | 11/1992 | Olson et al. | 52/746 |
| 5,170,832 | 12/1992 | Wagner | 160/201 |
| 5,239,799 | 8/1993 | Bies et al. | 52/309.11 |
| 5,285,608 | 2/1994 | Costello | 52/456 |
| 5,369,869 | 12/1994 | Bies et al. | 29/460 |
| 5,693,271 | 12/1997 | Johnson et al. | 264/46.6 |

*Primary Examiner*—Allan R. Kuhns

*Attorney, Agent, or Firm*—Renner, Kenner, Greive, Bobak, Taylor & Weber

[57] ABSTRACT

A foam-filled door manufactured in accordance with the present invention comprises a frame (11) having a pair of ledge areas (58) extending about substantially the entire inner periphery of the frame (11). The frame (11) is formed by the spaced parallel positioning of a pair of rails (12) and a pair of stiles (14). The ledge areas (58) formed in the frame (11) are of substantial width and depth to provide an area of bonding between the facers (20, 21) and the frame (11). The ledge areas (58) also form vents (100) that allow air to escape from a cavity (22) formed between the frame (11) and pair of facers (20, 21) when a foaming material is injected into the cavity (22) to prevent internal air pockets from forming. The facers (20, 21) have flanges (90, 92) that surround substantially the entire outer periphery of the facers (20, 21) and engage the outer periphery of the frame (11). In manufacturing the foam-filled door (10), a force is evenly applied normal to the facers (20, 21) during the foam injection step to prevent the facers (20, 21) from moving away from the frame (11). The force allows the frame (11) to expand as the foam expands so that the frame (11) contacts the flanges (90, 92) of the facers (20, 21), creating tensile forces in the facers (20, 21).

6 Claims, 3 Drawing Sheets

METHOD OF MAKING A FOAM-FILLED DOOR

This application is a division of application Ser. No. 08/580,837, filed Dec. 29, 1995, now Pat. No. 5,720,142

TECHNICAL FIELD

The present invention relates generally to a door panel and method of manufacture. More particularly, the present invention relates to a foam-filled door and a method for its construction. Specifically, the present invention relates to a method for manufacturing a foam-filled door having a pair of facer members supported by a frame, the foam providing the adhesive and tensile forces necessary to support the door and provide smooth facer members.

BACKGROUND ART

Foam-filled doors have been manufactured for several years for a variety of uses, e.g., side-hinged entry doors. Such foam-filled doors have advantages over solid wood doors in that foam-filled doors are generally lighter and less expensive, yet can be made to be as aesthetically pleasing as solid wood doors.

In order to decrease the costs of producing doors, manufacturers desire to minimize the materials used in constructing such foam-filled doors. Manufacturers also desire to decrease the amount of time necessary to manufacture the doors. It is further desirable to accomplish the preceding goals while decreasing the percentage of imperfect doors produced in a manufacturing line.

One known method for forming a foam-filled door includes the steps of configuring a frame from rigidly connected rails and stiles; connecting a skin member, or facer, over one side of the frame; applying an even layer of adhesive to the inner side of the facer; inserting pre-formed foam blocks into the frame; and then connecting a second facer over the other side of the frame. More specifically, the frame may be constructed from wood or metal members that are rigidly connected at right angles by screws or other appropriate connecting devices. The facers that are connected to the frame may be formed from a relatively heavy-gauge sheet metal. Increased thickness of the sheet metal helps hide imperfections that would otherwise appear on the outer surface of the door. The pre-formed foam blocks must be accurately sized to prevent the creation of air pockets or voids inside the door which permit moisture collection and reduce insulating characteristics. Another important factor in preventing air pockets is the application of the adhesive to the facers and the foam blocks. The adhesive must be evenly applied and must bond to approximately 100 percent of the facer's inside surface. An even application of adhesive is virtually essential to create a smooth outer surface on the facer. If the adhesive is unevenly applied, surface imperfections will be visible in the outer surface of the facer, and the door will be of inferior quality or a reject. In order to decrease the effect of the adhesive on the facer, heavier-gauge facer plates have been used in the industry. The heavier gauge, however, increases the weight of the door and increases the material cost component of manufacturing the door.

After the adhesive is applied to the inner surface of the first facer and the foam blocks have been inserted according to the subject known method, an adhesive layer is applied to the foam blocks and the inner surface of the second facer. The second facer is then applied to the other side of the frame. Here again, the application of the adhesive in an even layer is important in creating an even bond between the facer and the foam blocks. Perhaps just as important as the even application of the adhesive is the elimination of air pockets in the door. Air pockets are undesirable because they allow moisture to accumulate inside the door, leading to premature deterioration. Air pockets are also undesirable because they detract from the aesthetics of the door by causing bubbles or wrinkles in the facers. Air pockets that occur directly beneath the facer surface allowing the facer to distort are referred to in the art as "oil canning". A further undesirable aspect of this known method is the excessive amount of time necessary to assemble the door.

Another known method of manufacturing a foam-filled door utilizes a poured-in-place process. Such a method generally includes the steps of forming a rigid frame, connecting a pair of facers to each side of the frame, and then pouring or injecting foam into the cavity formed by the frame and the facers. The foam may be relied upon to provide structural support for the door or simply to provide insulation. Problems with this method are that the foaming process often leads to undesirable air pockets that cause doors to be of poor quality or to be rejected. Air pockets are formed when foam is injected into the door, trapping air against the facers and proximate the corners of the frame. These air pockets cause oil canning and lead to moisture accumulation. Another problem is that the foam bond between the frame and the facers is often not strong, leading to eventual delamination and resultant loosening of the facers. One attempt to solve the oil-canning problems in this method has been to use a heavier-gauge facer material. The heavier-gauge material is more resistant to the effects of air pockets but increases the weight and the cost of the doors.

DISCLOSURE OF THE INVENTION

In light of the foregoing, it is an object of the present invention to provide a method of forming a foam-filled door that is characterized by ease of construction and a consistently high-quality product. Another object of the present invention is to provide such a method for forming a door which includes the basic steps of forming a frame, positioning a pair of facers with respect to the frame, and injecting a foaming material into the space between the facers.

A further object of the present invention is to provide a door having a frame which retentively engages substantially all four edges of the facers. Another object of the present invention is to provide a frame having two ledge areas of substantial width and depth that are disposed about substantially the entire periphery of the frame. The ledge areas allow foam to accumulate and provide strong adhesion between the facers and the frame in close proximity to the outer periphery of the facer and of sufficient foam depth for adequate structural integrity to prevent delamination of the facers.

Still a further object of the present invention is to provide a method for forming a foam-filled door, including the step of injecting the foaming material between the facers and the frame, such that the foaming material creates tensile forces in the facers that act to tighten the facer surfaces so as to be drawn and remain smooth. Another object of the present invention is to provide a method for forming a foam-filled door wherein a foaming material is injected into a cavity formed by the interconnected frame and facers, such that the expansion of the foaming material urges the frame members outwardly, creating tensile force in the facers. Yet another object of the present invention is to provide a method for forming a foam-filled door by applying substantially uniform tension to the facers so that relatively thin-gauge material can be used without surface imperfections. Still a further object of the present invention is to provide a process including application of a force normal to the facers to prevent the foaming material from displacing the facers upwardly and downwardly away from the frame during expansion, while permitting the frame to move outwardly.

Another object of the present invention is to provide a method for forming a foam-filled door, as above, wherein the frame is provided with a plurality of vents that allow air to escape from the cavity while the foaming material is injected into the cavity and expanding therein for the elimination of air pockets and to promote more uniform cell structure for good adhesion and structural integrity. Still another object of the present invention is to provide vents that will fill with the foaming material after the foaming material has completely filled the area between the facers and the frame.

In general, the present invention contemplates a door including a frame; the frame having two ledge areas extending about substantially the entire inner periphery of the frame; each of the ledge areas having substantial depth and substantial width; first and second facers engaging the frame and forming a cavity therebetween; one of the ledge areas being proximate to one of the facers; the other of the ledge areas being proximate to the other of the facers; a plurality of flanges extending about substantially the entire outer periphery of each of the facers; the flanges engaging the frame about substantially the entire outer periphery of the frame; and a foam material disposed between the facers and the frame and exerting outward force on the frame, thereby creating omnidirectional tensile forces in each of the facers.

The present invention further contemplates a method for forming a door, including the steps of forming a pair of stiles having a pair of inwardly-disposed ledge areas of substantial width and substantial depth; forming a pair of rails having a pair of inwardly-disposed ledge areas of substantial width and substantial depth; arranging the stiles and rails to form a frame, such that the ledge areas connect to form a pair of ledge areas extending about substantially the entire inner frame periphery; positioning a pair of facers on each side of and connected to the frame to form a cavity within the frame and the facers; placing the facers and the frame in a press that engages only the facers; and introducing a foaming material into the cavity, such that the foaming material fills the ledge areas, fills the cavity, and urges the stiles and frames outwardly to create tensile forces in the facers.

PREFERRED EMBODIMENT FOR CARRYING OUT THE INVENTION

Figure 1:
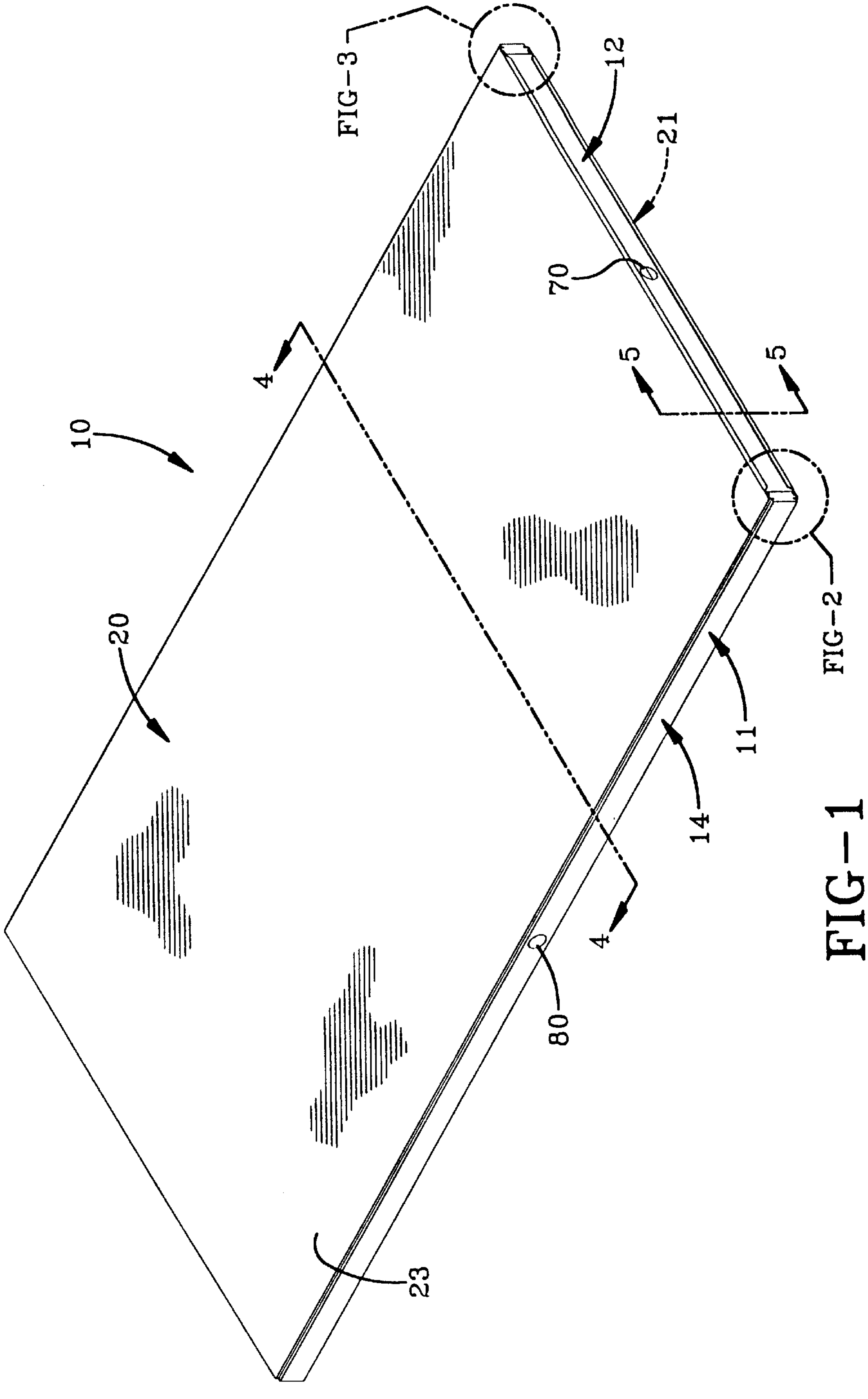
FIG. 1 is a perspective view of an exemplary foam-filled door according to the concepts of the present invention, manufactured according to the concepts of the method of the present invention.

A foam-filled door according to the concepts of the present invention is generally indicated by the numeral 10 in FIG. 1. The door 10 has a peripheral frame, generally indicated by the numeral 11, composed of a pair of spaced parallel rails, generally indicated by the numeral 12, disposed at substantially right angles to a pair of spaced parallel stiles,,generally indicated by the numeral 14. In alternative embodiments of the present invention, the frame 11 may be formed in shapes other than a rectangle. Frames having other shapes will function with the method of the present invention as long as the frame has the characteristics described below.

Figure 2:
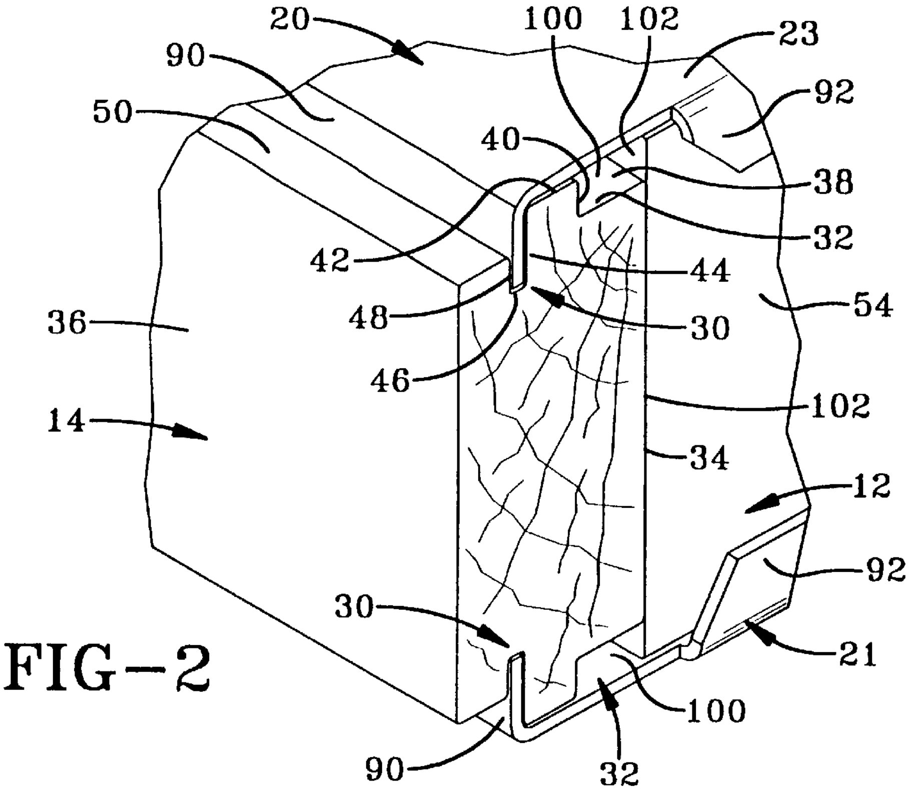
FIG. 2 is an enlarged, fragmentary perspective view of the corner of the door of FIG. 1 designated as FIG. 2 thereon and showing details of the interrelation between a stile and the facers.
Figure 3:
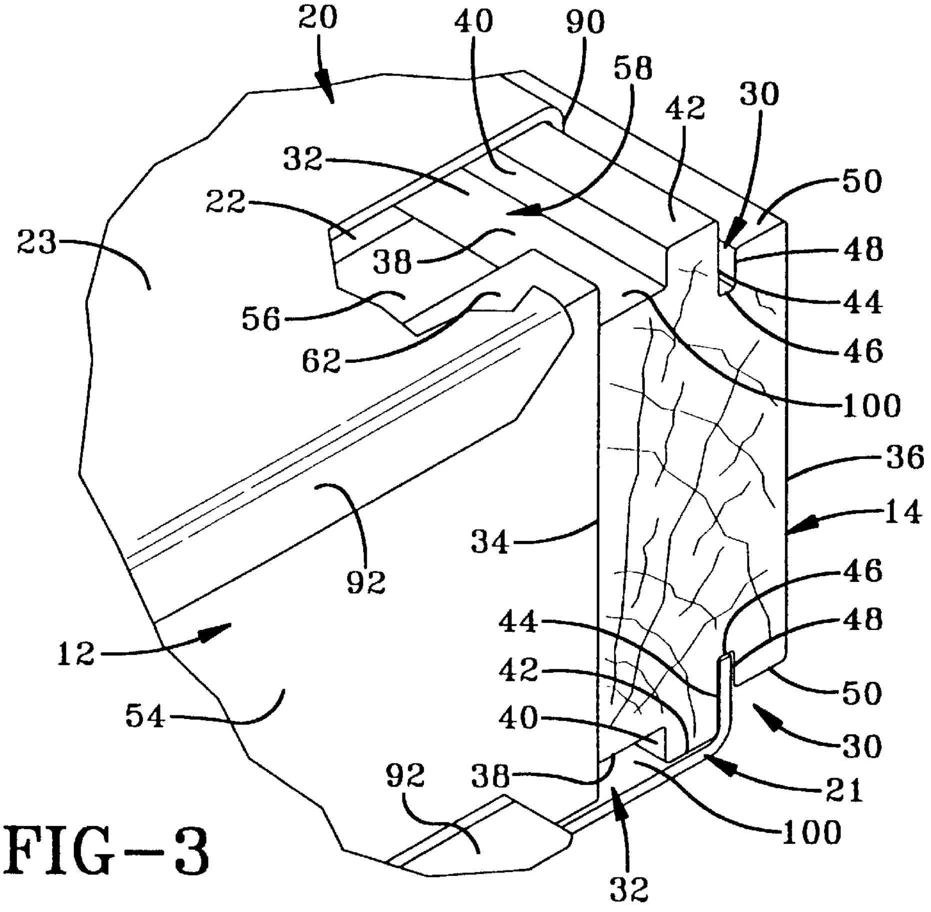
FIG. 3 is an enlarged, fragmentary perspective view of another corner of the door of FIG. 1 designated as FIG. 3 thereon with the top facer partially broken away to show details of a peripheral ledge.

A front facer, generally indicated by the numeral 20, and a back facer, generally indicated by the numeral 21, engage the frame 11 to form an internal cavity 22, as shown in FIG. 3. Each facer 20, 21 has a planar body portion 23 long enough to extend between and overlap the rails 12 and wide enough to extend between and partially overlap the stiles 14. The facers 20, 21 may advantageously be constructed from a thin-gauge sheet metal and engage the frame 11 in a manner that will hereinafter be more thoroughly described. FIGS. 2 and 3 are enlarged, fragmentary perspective views depicting two corners of a door 10 manufactured according to the method of the present invention. FIG. 2 depicts the connection between the facers 20, 21, a stile 14, and a rail 12. In FIG. 3, part of the facer 20 has been broken away to show the internal interrelationship between a rail 12 and a stile 14.

As can be seen particularly in FIG. 3, each stile 14 has a pair of grooves, generally indicated by the numeral 30, and a pair of ledge areas, generally indicated by the numeral 32. Each stile 14 has an inner surface 34 constituting one boundary of cavity 22 and an outer surface 36. The inner surface 34 terminates in the direction of facers 20, 21 in a pair of ledge floors 38 disposed at substantially right angles thereto. Each ledge floor 38 extends outwardly and meets a ledge wall 40 extending therefrom at substantially a right angle. Each ledge wall 40 meets a facer contact surface 42 that extends outwardly away from the cavity 22 at substantially a right angle to the ledge wall 40 and to the inner surface 34 and outer surface 36. The combination of the inner surface 34, the ledge floors 38, the ledge walls 40, and the facer contact surfaces 42 define the ledge areas 32 which extend a substantial distance into the stiles 14 and are of a substantial depth and width.

Outwardly of each ledge area 32 is a groove 30. In that respect, each facer contact surface 42 meets an inner groove wall 44 that extends at substantially a right angle from each facer contact surface 42. Each inner groove wall 44 ends at a groove floor 46 that extends outwardly therefrom. An outer groove wall 48 connects each groove floor 46 to an inset wall 50 which substantially parallels facer contact surface 42 and meets the outer surface 36 at substantially right angles to complete the profile of the stile 14. The dimensions of the walls and surfaces and the angles at which they meet may be adjusted, depending on the type and desired characteristics of a particular door 10 that is being formed.

Figure 5:
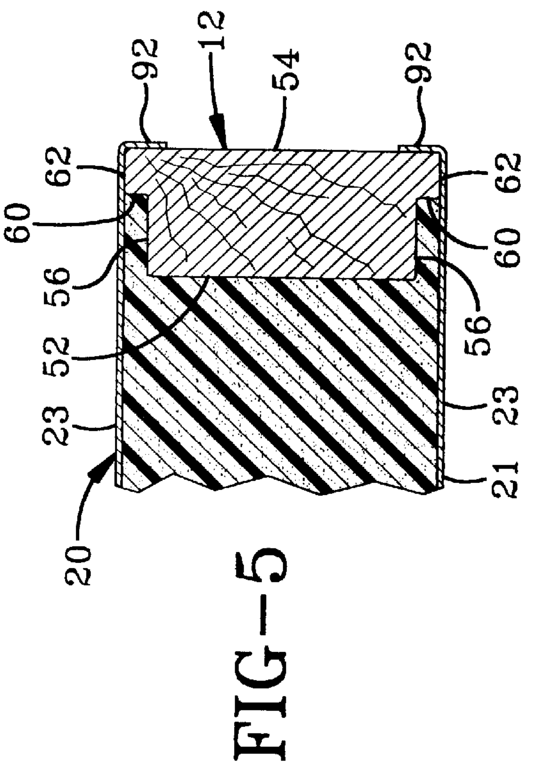
FIG. 5 is a cross-sectional view of a fragmentary portion of a door according to the present invention taken substantially along line 5—5 of FIG. 1.

The frame 11 has a pair of rails 12 interposed between the stiles 14. As best seen in FIG. 5, each rail 12 has an inner surface 52 and an outer surface 54 which is substantially parallel thereto. The inner surface 52 terminates in a pair of outwardly extending ledge floors 56 disposed at right angles thereto. The inner surfaces 52 of the rails 12 may be of substantially the same dimension as the inner surface 34 of the stiles 14. Further, the ledge floors 56 of the rails 12 may be disposed coplanar with the ledge floors 38 of the stiles 14 and combine to form a pair of ledge areas 58 of substantial depth and width, which extend around the entire inner periphery of a pairs 11. The ledge floors 56 of the rails 12 meet a pair of ledge walls 60 that are preferably the same height as the ledge walls 40 of the stiles 14. The ledge walls 60 extend away from the ledge floors 56 and meet a pair of facer contact surfaces 62 which are disposed at substantially right angles thereto. The facer contact surfaces 62 are disposed substantially coplanar with the facer contact surfaces 42 of the stiles 14. The facer contact surfaces 62 of the rails 12 extend outwardly and meet the outer surface 54 of the rails 12 at an approximate right angle.

Also present in the frame 11 is at least one foam injection port 70. The injection port 70 provides access to the cavity 22 from the outside of the frame 11. A hardware area 80 is provided in one of the stiles 14 to allow a doorknob, locking mechanism, or the like to be added after the door 10 has been formed.

Each facer 20, 21 is generally formed in the shape of a rectangle, with the two opposing edges that engage the stiles 14 having projecting stile flanges 90 and the two opposing edges that engage the rails 12 having projecting rail flanges 92. Each stile flange 90 extends at an angle of substantially ninety degrees to body portion 23 of facers 20, 21 and is configured to interfittingly match the dimensions of the grooves 30 in the stiles 14. The height of the inside surface of the stile flanges 90 may be slightly less than the depth of the grooves 30 so that the inner surface of facers 20, 21 positively engages the facer contact surfaces 42 on the stiles 14 and the rails 12. The rail flanges 92 extend at an angle of substantially ninety degrees to the body portion 23 of facers 20, 21 and are configured to overlap a portion of the outer surface 54 of the rails 12, as shown in FIG. 5. The stile flanges 90 are substantially the same length as the stiles 14, as may be seen in FIGS. 1 and 2. However, the rail flanges 92 are slightly shorter than the rails 12, as seen in FIGS. 1 and 3, and do not extend over the entire length of the rails 12 for a reason described below. The flanges 90, 92, therefore, extend around substantially the entire periphery of the facers 20, 21.

The method of forming a door 10 with the components thus far described involves an initial step of producing rails 12 and stiles 14 in the configurations described above. Thereafter, a pair of rails 12 and a pair of stiles 14 are arranged to form a frame 11. The rails 12 are parallel and form approximate right angles with parallel stiles 14, such that the ledge floors 56 and 38 form two continuous surfaces around the inner periphery of the frame 11. The ledge areas 32, 58 are disposed in the frame 11 at a location proximate the outer periphery of the facers 20, 21. The frame 11 is non-rigidly connected so that the stiles 14 and rails 12 may separate slightly when subjected to a moderate force. As can perhaps be best seen in FIGS. 2 and 3, the ledge areas 32 in the stiles 14 extend along the entire length of the stiles 14 to form eight vents 100 that allow air to escape from the cavity 22 when the foaming material is introduced. The rails 12 have planar ends 102 so as to not block the ledge area 32 of the stile 14. As described above, the rail flanges 92 of facers 20, 21 are slightly shorter than the rails 12 so that they do not block or cover the vents 100, thereby allowing the cavity 22 to be connected with the environment outside the door 10. The method of forming the vents 100 also permits the rail 12 and stile 14 material to be formed in long lengths, kept in stock, and cut to length when the size of a desired door 10 is known.

Figure 4:
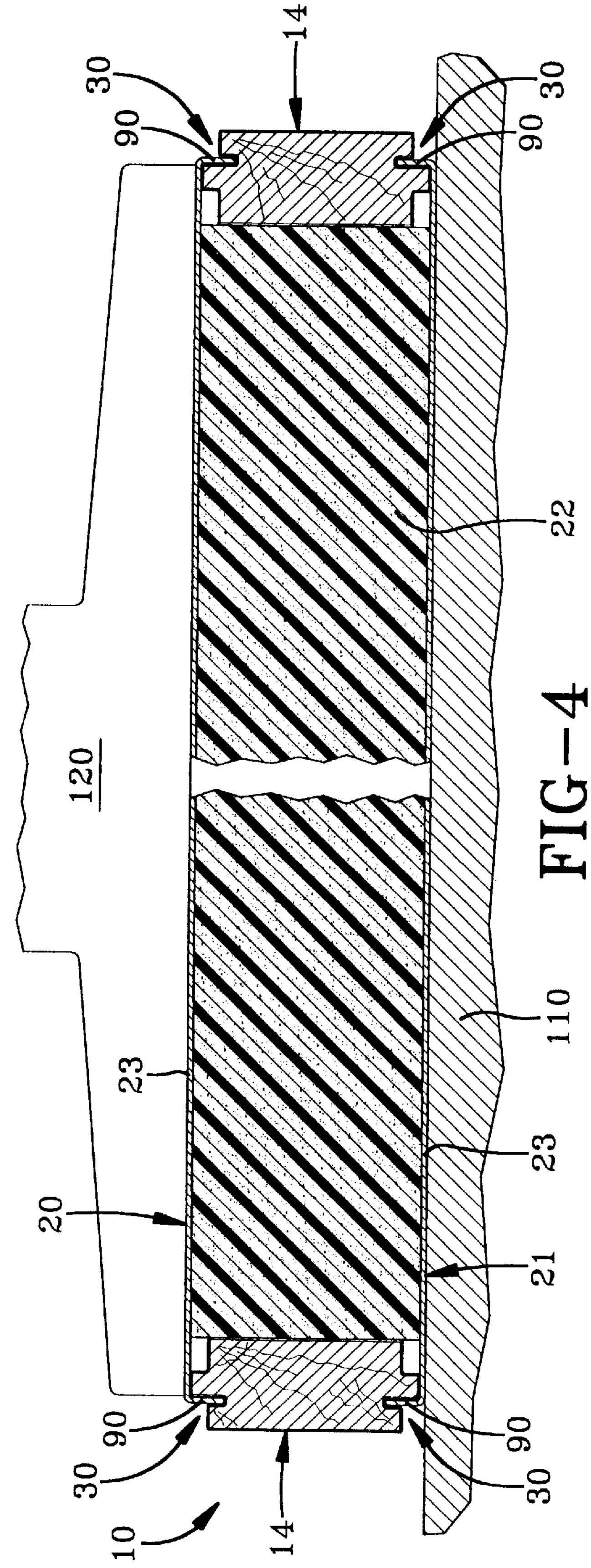
FIG. 4 is a fragmentary sectional view taken along line 4—4 in FIG. 1 showing a door according to the present invention positioned in a press.

Once the frame 11 is configured, the facers 20, 21 are positioned on each side of the frame 11, thereby forming a cavity 22. As seen in FIG. 4, the first facer 21 may be laid on a flat surface 110 and the frame 11 placed over it, such that the stile flanges 90 engage the grooves 30 on the stiles 14, and the rail flanges 92 are located just outwardly of the rails 12 proximate outer surface 54 of rails 12. The second facer 20 may then be laid over the frame 11, with the stile flanges 90 engaging the other set of grooves 30 in the stiles 14 and the rail flanges 92 located just outwardly of the rails 12. In this manner, the flanges 90, 92 engage substantially the entire outer periphery of the frame 11. When the method of the present invention is utilized to make large doors, additional frame support elements may be added to the cavity 22 to help support the facers 20 and to provide extra rigidity for door 10.

After the facers 20, 21 are positioned, a movable press member 120 is placed above the upper facer 20, such that the outer surface of the facer 20 is in contact with the press member 120 but is not being significantly compressed by the press member 120. The purpose of the press member 120 is to keep the facers 20, 21 from separating from the frame 11 when the cavity 22 is being filled with the foaming material. The fixed press surface 110 on which the first facer 21 is resting serves to support the facer 21 and provide, with press member 120, the force necessary to keep the facers 20, 21 from separating from the frame 11. In the preferred embodiment of the present invention, the press member 120 merely counteracts any force that the facer 20 exerts on it. In this way the press member 120 holds the position of the facer 20 relative to the frame 11.

The next step of the method of the present invention is the introduction of the foaming material to the cavity 22. The foaming material may be of a type that expands after it has been injected and may also possess adhesive properties. Furthermore, the foaming material may provide structural support after it sets. It is also desirable that the foaming material have insulating properties. The foaming material is injected into the cavity 22 through at least one foam injection port 70 present in the frame 11. The foaming material is injected by any of numerous known methods. As the foaming material fills the cavity 22, air is forced out of the cavity 22 through the vents 100 present in the frame 11. Locating the vents 100, as described above, ensures the escape of air, thereby preventing the formation of undesirable air pockets in the completed door.

The foaming material also substantially fills the ledge areas 58 and forms a gasket between the facers 20, 21 and the frame 11. The ledge areas 58 prevent the facers 20, 21 from becoming disconnected from the frame 11 by creating an area where the foaming material adheres to both the frame 11 and the facers 20, 21 in sufficient thickness to provide good adhesion to both the frame 11 and facers 20, 21 and in close proximity to the outer periphery of facers 20, 21.

As the foaming material expands and substantially fills the cavity 22, it exerts force on and urges the stiles 14 and rails 12 outward. The stiles 14 are held by the facers 20, 21 and particularly by the stile flanges 90. Similarly, the rails 12 are held by the facers 20, 21 and particularly by the rail flanges 92. Thus, as the stiles 14 and rails 12 are urged outward, substantially omnidirectional tensile forces are created in the facers 20, 21 as the frame 11 exerts force on the facers 20, 21. The tensile forces tend to tighten the facers 20, 21 and remove wrinkles and uneven areas. The forces that the foam creates as it expands also assist in assuring adhesive bonding of the foam. The foam forces itself into the ledge areas 58 and forces itself against both facers 20, 21, creating forces against the press member 120 that hold the facers 20, 21 in place. When the foaming material sets up, it adheres to the facers 20, 21 and the frame 11, creating a rigid connection between the frame members 12 and 14 and the facers 20, 21. The facers 20, 21 are held in place not only by the adhesive attachment to the foam but also by the outward forces created by the foam within the stiles 14 and the rails 12.

Thus, it should be evident that the foam-filled door and method for manufacturing the door disclosed herein fulfills the various objects of the present invention set forth above and otherwise constitutes an advantageous contribution to the art. As will be apparent to persons skilled in the art, modifications can be made to the preferred embodiment of the present invention disclosed herein without departing from the spirit of the invention, the scope of the invention being limited solely by the scope of the attached claims.

I claim:

1. A method for forming a door, comprising the steps of:

forming a pair of stiles having a pair of inwardly-disposed ledge areas of substantial width and substantial depth;

forming a pair of rails having a pair of inwardly-disposed ledge areas of substantial width and substantial depth;

arranging said stiles and rails to form a frame such that said ledge areas connect to form a pair of ledge areas extending about substantially the entire inner frame periphery;

positioning a pair of facers on each side of said frame to form a cavity within said frame and said facers;

placing said facers and said frame in a press engaging only said facers; and introducing a foaming material into said cavity such that said foaming material fills said ledge areas, fills said cavity, and urges said stiles and rails outwardly to create tensile forces in said facers.

2. A method for forming a door according to claim 1, wherein the step of forming said stiles further comprises the step of forming a groove in each of said stiles and forming flanges on said facers for engaging said grooves in said stiles.

3. A method for forming a door according to claim 1, wherein said step of adding foaming material comprises:

adding foaming material into said cavity through at least one foam injection port disposed in said frame;

allowing said foaming material to expand and adhere to said frame and said facers; and employing said expanding foam to urge said stiles and said rails outward thereby creating tensile forces in said facers.

4. A method for forming a door according to claim 1 wherein the step of arranging said stiles and rails to form a frame further comprises the step of arranging said stiles and rails such that said ledge areas in said stiles form vents in said frame.

5. A method for forming a door according to claim 4, wherein the step of adding foaming material into said cavity further comprises allowing air trapped in said cavity to escape said cavity through said vents.

6. A method for forming a door according to claim 1, wherein the step of positioning a pair of facers of each side of said frame further comprises the step of forming flanges on each facer and positioning each of said facers such that said flanges engage said frame.

* * * * *